United States Patent
Currie

[15] 3,699,587
[45] Oct. 17, 1972

[54] P.P.I. DISPLAY UTILIZING MAGNETIC RECORDING APPARATUS
[72] Inventor: William E. Currie, Seattle, Wash.
[73] Assignee: Honeywell Inc., Minneapolis, Minn.
[22] Filed: July 22, 1971
[21] Appl. No.: 164,987

[52] U.S. Cl. ............... 346/74 M, 178/7.5 D, 346/21, 343/5 PC
[51] Int. Cl. .......................... G01d 9/00, G01d 15/12
[58] Field of Search ....... 346/74 ES, 74 M, 74 MP, 8, 346/21; 178/7.3 D, 7.5 D; 340/324 R; 343/5 PC

[56] References Cited

UNITED STATES PATENTS

| | | | |
|---|---|---|---|
| 1,697,166 | 1/1929 | Davis | 346/21 |
| 3,022,130 | 2/1962 | Casiglia | 346/21 |
| 3,292,171 | 12/1966 | Wilson | 340/324 R |

*Primary Examiner*—Bernard Konick
*Assistant Examiner*—Gary M. Hoffman
*Attorney*—Arthur H. Swanson et al.

[57] ABSTRACT

A P.P.I. type display uses a display face having a suspension of magnetically orientable and light reflective particles which are orientable between two incident light reflecting states. A rotating erasing means is used to uniformly orient the particles into the first state while a rotating recording means carrying discrete recording elements is selectively actuated to orient selected ones of the particles into the second state. The erasing means and recording means are mounted on separate arms connected together at one end to a common motor driven shaft located at the center of the display face and perpendicular thereto.

7 Claims, 3 Drawing Figures

PATENTED OCT 17 1972

INVENTOR.
WILLIAM E. CURRIE
BY M. J. Halista

P.P.I. DISPLAY UTILIZING MAGNETIC RECORDING APPARATUS

BACKGROUND OF THE INVENTION

The prior art P.P.I. display used for sonar and other applications uses a cathode-ray tube having a display face phosphor with a long persistance display characteristic. When operated in a very low ambient light environment, it is possible to produce a cathode-ray tube P.P.I. display having a useful persistance of 1 to 2 minutes so that a complete 240° sweep sector can be observed. Amplitude information is presented on the P.P.I. display in binary form whereby any signal exceeding a predetermined threshold is marked with equal intensity. This is done to provide maximum visibility under daylight conditions. However, under normal daylight conditions and in a pilot house of a vessel, the effective P.P.I. persistance time of a present cathode-ray tube sonar display is about 1 second. This allows the operator to see about only about two sweeps, or 15 degrees presented on a 400-yard range, which means that all actual target position and ship characteristics have to be integrated and remembered in the operator's mind rather than on the P.P.I. display itself. Additionally, when conditions of an open bridge operation and daylight viewing are imposed, it becomes impossible to view the display without the use of a viewing hood which introduces a time lag for the observer's eyes to accommodate to the lower light level of the display. One method used to overcome this problem in prior art sonars used for either fishing or navigation is to display the target information as a function of range and time on a conventional chart recorder to produce a permanent chart record which is easly viewable in bright daylight and allows integration of targets in a general area over any desired time period. Since, in most cases, all that is desired for this type of sonar application is a temporary daylight display, the consumption of conventional recording paper as well as the addition of a chart recorder is a highly undesirable expense. Alternatively, an auxiliary memory means could be provided to store the information being displayed on the cathode-ray tube and to refresh the display periodically in order to overcome the limited persistance of the phosphor. Such a modification would also significantly increase the cost of the overall display system. Accordingly, it is desirable to provide a display which would overcome the major shortcoming of the conventional prior-art search sonar with respect to the lack of a display memory over the scan interval. Specifically, a P.P.I. display system is needed which would provide daylight display with a display memory to allow scan-to-scan integration of targets without the necessity of an auxiliary memory system as well as providing either complete or partial erasing to avoid the necessity of using up conventional recording paper in a chart recorder.

Accordingly, it is an object of the present invention to provide an improved P.P.I. display.

Another object of the present invention is to provide an improved P.P.I. display having an inherent display memory.

A further object of the present invention is to provide an improved P.P.I. display having display memory and erasure capabilities.

A further object of the present invention is to provide an improved recorder for continuously recording a visable display on a recording surface.

A still further object of the present invention is to provide an improved recorder for providing a visual display of continuously recorded information with concurrent continuous erasure of previously recorded information to provide a fresh recording surface.

SUMMARY OF THE INVENTION

In accomplishing these and other objects, there has been provided, in accordance with the present invention, a recording apparatus having a display face including a sheet of a support substrate having deposited thereon microscopic capsules containing magnetically orientable light reflective particles. A relative motion between the display face and a recording transducer assembly may be induced by arranging the display face in the form of a flat display face and having the transducer assembly mounted on an arm rotating in a plane parallel to the display face and having an axis of rotation located coaxially with the center of the display face. An erasing means is arranged to precede the recording transducer assembly across the display face to erase a recording on the display face prior to a new recording operation by the recording transducer assembly.

BRIEF DESCRIPTION OF THE DRAWINGS

A better understanding of the present invention may be had when the following detailed description is read in connection with the accompanying drawings, in which.

DETAILED DESCRIPTION

Figure 1:
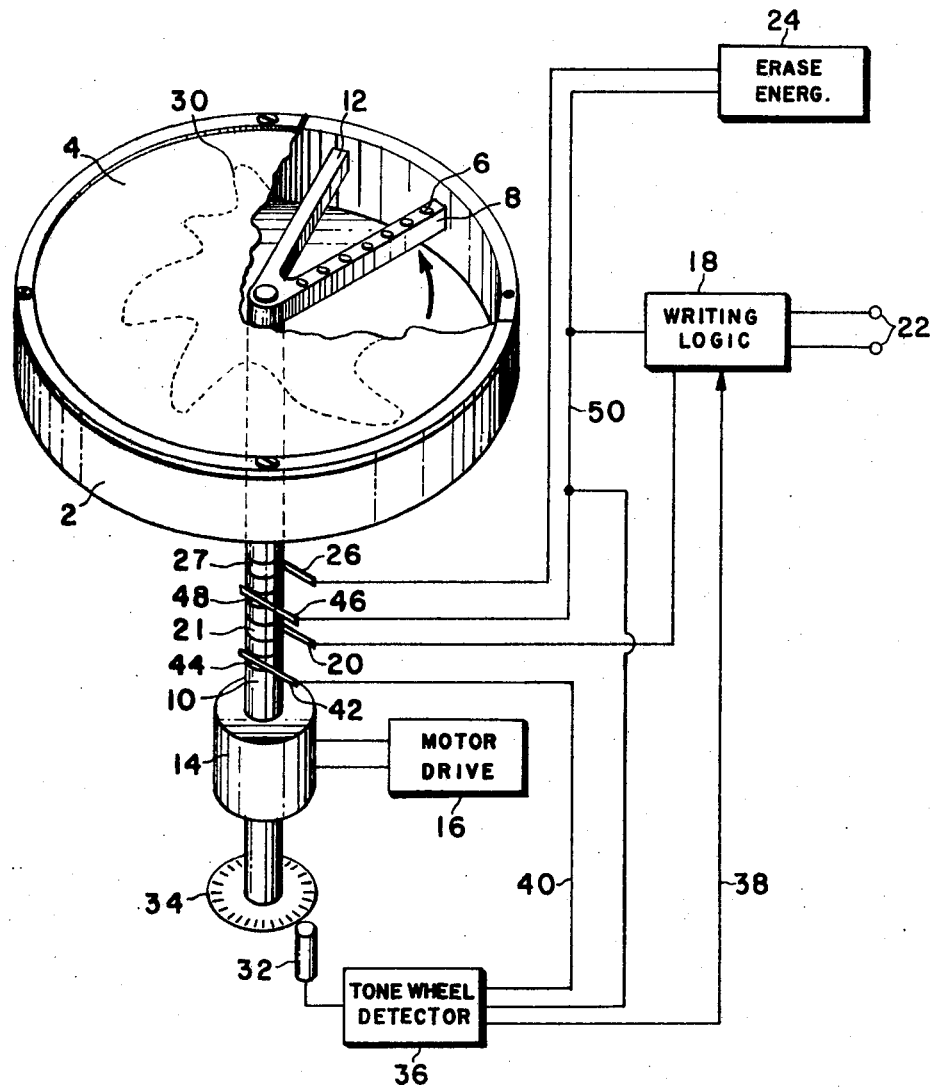
FIG. 1 is a pictorial illustration of a display system embodying the present invention.

Referring to FIG. 1 in more detail, there is shown a recording system in the form of a P.P.I. display embodying the present invention. A hollow cylindrical frame 2 is arranged to support a sheet of a particle oriented recording medium 4 across an open end thereof. The recording medium 4 may be a recording medium having a substrate covered with a plurality of transparent capsules containing a suspension of magnetically actuable, highly reflective and flake-like particles therein. Such a recording medium is shown in a copending application of Tommy N. Tyler, Ser. No. 861,062 filed on Sept. 25, 1969, now U.S. Pat. No. 3,633,720, and assigned to the same assignee as the present invention. The recording medium 4 is shown in a partially broken-away representation for the purpose of clarifying the rest of the structure of the present invention. A recording arm 8 having a plurality of recording elements 6 mounted thereon is attached at one end thereof to a motor driven shaft 10. Suitable recording elements for use as elements 8 are shown in the aforesaid copending patent application. A second arm 12 having a display erasing means mounted thereon is also attached at one end thereof to the motor shaft 10 and is arranged to precede the recording arm 8 in the direction of rotation of the motor shaft 10. The motor shaft 10 is located in axial alignment with and within the cylindrical support means 2 and is driven by a motor means 14. The motor means 14 is energized from a suitable motor drive means 16 which may be actuated by any suitable means, e.g., an on-off switch, (not shown).

Figure 2:
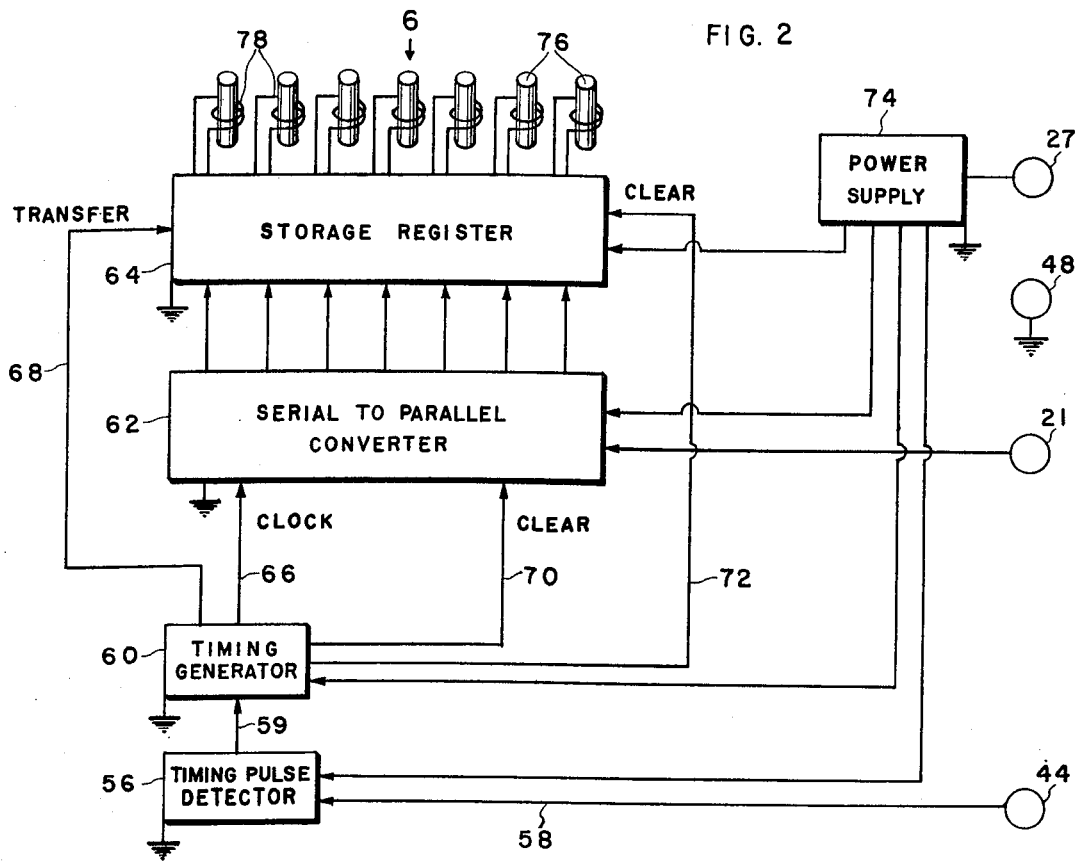
FIG. 2 is a block diagram schematic of a logic system suitable for use with the display system shown in FIG. 1.

A writing logic circuit 18 is connected by means of a brush 20 riding on a first slip ring 21 on the motor shaft 10 and an electrical conductor (not shown) on the shaft 10 connected to the slip ring 21 to the recording elements 6 on the recording arm 8. A suitable circuit for operating the recording elements 6 is shown in FIG. 2 and described in detail hereinafter. The writing logic 18 may be any suitable circuit capable of being energized by input signals applied to a pair of input terminals 22 connected to the writing logic 18 to produce signals for operating the recording elements 6, e.g., an analog-to-digital converter. For example, the writing logic 18 may be a well-known analog-to-digital converter arranged to convert an analog input signal to a count stored in a counter representative of a time duration corresponding to an instantaneous amplitude of the input signal on input terminals 22. By shifting the stored count out of the counter, a digital output pulse having a position with respect to the shifting operation duration is obtained. Thus, each converted amplitude of the input signal applied to input terminals 22 is represented by a group of serial pulses positions with the number of pulses in each group corresponding to the number of recording elements 6 to be energized by each group of pulses. An erase energizing means 24 is connected to the erasing arm 12 by means of a brush 26 riding on a second slip ring 27 the motor shaft 10 and an electrical conductor on the shaft 10 providing a suitable signal carrying path to the erase arm 12. The writing logic 18 is arranged to energize the recording elements 6 on the recording arm 8 to produce a display curve 30 on the recording medium 4. The operation of the writing logic 18 and the recording elements 6 is synchronized by synchronizing signals obtained from a detector means 32 arranged to detect prerecorded indicia on a tone wheel 34 attached to the motor shaft 10. The detector means 32 may be any suitable detecting means arranged to detect the indicia on the tone wheel 34, such detector and tone wheel combinations being well-known in the art. The output signals from the detector 32 are applied to a tone wheel detector circuit 36 arranged to produce the necessary timing signals in response to output signals from the detector means 32. A first timing signal from the detector circuit 36 is applied along a first timing line 38 to the writing logic 18. A second timing signal is applied to the circuits for energizing the recording elements 6 by a second timing line 40 connected to a third brush 42 riding on a third slip ring 44 on the motor shaft 10. The third slip ring 44 is connected to the recording arm by an electrical conductor (not shown) mounted on the motor shaft 10. A fourth brush 46 and a fourth slip ring 48 are connected to provide a common ground path between the circuits on the erase arm 12 and the record arm 8 and a common ground line 50 connected to the tone wheel detector circuit, the writing logic 18 and the erase energizing circuit 24.

In operation, the motor shaft 10 is rotated by the motor 14 under control of the motor drive circuit 16 to sweep the recording arm 8 and the erase arm 12 along the surface of the recording medium 4. The selective energization of the recording elements 6 at each location of the timing indicia on the tone wheel 34 by the writing logic 18 is effective to produce a display curve 30 on the recording medium 30. The display curve 30 is composed of a series of discrete marks having a different contrast with respect to the background provided by the unrecorded areas of the recording medium 4. This difference in contrast is achieved in the display curve area by reorienting the suspended particles in the recording medium 4 to affect their light reflecting capabilities with respect to incident light. Specifically, the particles before recording are preoriented by the erasing means in the erase arm 12 to lie parallel to the viewing surface of the recording medium 4 whereby a light reflecting surface is created. The recording elements 6 are effective to reorient the particles in the display curve area to be perpendicular to the display surface whereby incident light is absorbed. Thus, as the arm 8 is driven in a circular path within the confines of the cylindrical support 2, the recorded display 30 is produced around the center of rotation of the arm 8 and is a representation of the input signal applied to the input terminals 22. Inasmuch as the erasing arm 12 precedes the recording arm 8, a new recording may be made on the recording medium 4 immediately following the erasing of the prior recording by the erasing arm 12. The erasing means on the erasing arm 12 may be simply a permanent magnet arranged to produce a magnetic field component within the plane of the recording medium 4 whereby to align, or orient, the magnetic particles in the recording medium 4 parallel to the viewing surface of the recording medium 4. On the other hand, the erasing means maybe a combination of a permanent magnet and a means for producing an alternating current field as shown in the aforesaid copending patent application. The energizing signal for the A.C. field is supplied by the erase energizing means 24. Of course, if a permanent magnet is used for erasing, i.e., aligning the particles, the recording medium 4, the erase energizing means 24 would only be used to supply an energizing signal to the recording element drive means on the recording arm 8, as hereinafter described.

The recording medium 4 is effective to retain the display waveshape 30 in a visible state until it is erased by the erasing means on the erase arm 8. Thus, the display 30 has a long persistance and, since it is dependent on incident light for its visibility, it can be viewed by an operator in a brightly lit environment without the need for a darkened viewing area. Further, the motor 14 may be stopped at any desired place and the display 30 existing at the time of stoppage of the motor 14 can be studied over an extended period of time without losing any of the recorded information. The display medium 4 may be arranged to be removed from the cylindrical support frame 2 to enable the recording made thereon to be stored and to allow the operator to replace, if necessary, the recording medium 4 with a new sheet of the particle oriented paper. Inasmuch as the recording medium 4 is effective to retain the display trace unless erased by the erasing means on the erase arm 12, no additional memory or display refreshing means is necessary to provide a long term display of the recorded information. Further, the continuous erasing process followed by the recording of new information allows the same sheet of display medium material 4 for to be reused indefinitely whereby the recorder can continuously record new information. Further, since the display medium 4 is responsive to an external magnetic field which maybe in the form of a magnetic pencil, i.e., a writing instrument supplying a magnetic field at a writing end thereof, additional information may be written on the display medium 4 at any time by the operator using such a magnetic pencil. Since the signals for energizing the recording elements from the writing logic 18 are high amplitude signals, the recording circuits on the recording arm 8 are arranged to be immune to the electrical noise generated by the brushes and slip rings on the motor shaft 10 whereby such electrical noise does not interfere with the recording of the input signals applied to the input terminals 22.

In FIG. 2 there is shown an example of a suitable circuit for activating the writing elements 6 mounted on the recording arm 8 in response to signals from the writing logic 18. The circuit shown in FIG. 2 may be mounted on the recording arm 8 in the form of semiconductor circuits either in discrete or integrated form. A timing signal detector 56 is connected by a line 58 to the third slip ring 44 whereby the detector 56 is supplied with a synchronizing, or timing, signal from the tone wheel detector 36 shown in FIG. 1 over the connecting wire 40 and brush 42. The application of this timing signal to the timing pulse detector 56 is effective to produce an output signal from the detector 56 which is applied along a line 59 to a timing generator 60, which may be any suitable circuit for producing a series of signals having predetermined durations and spacings, such circuits being well-known in the art. The timing generator, in turn, is effective to produce a plurality of output signals for controlling the application of the input signals from the writing logic 18 to the recording elements 6 whereby the input information is recorded on the recording medium 4 in the form of the waveshape 30. Specifically, the timing signals from the timing generator 60 are applied to a serial to parallel converter 62 and to a storage register 64. The serial to parallel converter 62 has an input circuit connected to the first slip ring 21 whereby output signals from the writing logic 18 in the form of a sequence of groups of discrete serial signals are applied to the serial to parallel converter 62. The serial to parallel converter 62 may be any suitable circuit for accepting each group of serial input signals from the writing logic 18 and applying each of the group serial signals in parallel to the storage register 64, such circuits being well-known in the art, e.g., a shift register. The storing of the serial signals from the writing logic 18 in the converter 62 is controlled by a series of clock pulses applied over line 66 to the serial to parallel converter 62 from the timing generator 60. A series of clock pulses is produced by the timing generator 60 for each group of input signals to store each group of serial pulses from the writing logic 18 representative of one display increment to be recorded by the recording elements 6. A second timing pulse from the timing generator 60 produced subsequent to each series of clock pulses is applied over line 68 to the storage register 64 to transfer the information stored in the converter 62 to the storage register 64. A third timing pulse is produced by the timing generator 60 after the second timing pulse and is applied over line 70 to the serial to parallel converter 62 to clear the converter 62 after the information previously stored therein has been transfered to the storage register 64. Finally, a fourth timing signal produced by the timing generator 60 after the third timing pulse is applied over line 72 to the storage register 64 to effect a clearing operation of the storage register 64 after the recording has been accomplished on the recording medium 4 of an increment of the waveshape 30. A power supply means 74 may be provided on the recording arm 8 to supply power to the pulse detector 56, the timing generator 60, the converter 62, and the storage register 64. The input power for the power supply 74 to be converted to appropriate energizing signals for the aforesaid circuits is obtained from the second slip ring 27 connected to the erase energizing means 24 and the fourth slip ring 48 connected to supply a common ground connection. As previously mentioned, if a permanent magnet arrangement is used for the erasing means on the erase arm 12, the power supply 74 would still be supplied by an external source such as the erase energization means 24.

In operation, the recording circuitry shown in FIG. 2 is arranged to detect a synchronizing signal from the tone wheel detector circuitry 36 supplied via slip ring 44 and connecting line 58 to initiate a storage operation of a group of serial pulses from the writing logic 18. Each group of serial pulses from the writing logic 18 is representative of an increment of the recorded waveshape 30. Specifically, in the embodiment shown in FIG. 1, each group of serial pulses from the writing logic 18 would be arranged to select one of the recording elements 6 on the recording arm 8 to produce a recording an instantaneous level of an input signal applied to input terminals 22. Thus, each group of serial pulses would consist of one pulse located at an appropriate position within the time period defining the group of serial pulses with the number of positions corresponding to the number of available recording elements 6. Each group of serial pulses is applied to the serial to parallel converter 62 via brush 20 and slip ring 21 to be converted to a parallel format having the same number of pulse locations as the serial train of pulses where the pulse in each group of pulses for selecting one of the recording elements 6 is stored in the converter 62 in a storage location corresponding to the desired recording elements 6. The number of clock pulses from the timing generator 60 for each group corresponds to the total number of possible serial signal storage locations within the converter 62 whereby the one pulse supplied from the writing logic 18 in each serial group is stored in a storage location corresponding to the position of the pulse in the serial train for energizing a desired one of the recording elements 6 shown as core elements 76 and windings 78. The transfer pulse from the timing generator 60 is, subsequently, applied to the storage register 64 along line 68 to transfer the stored pulse from the converter 62 to the storage register 64 in the same position as it occupied in the converter 62. The transfer of this signal is effective to energize the one of the recording elements 6 connected to the storage location of the storgae register 64 having the transfer pulse therein to effect a recording of an increment of the waveshape 30. Subsequently, the converter 62 and the storage register 64 are cleared by corresponding clear signals from the timing generator 60 to await the reception of the next input signal from the writing logic 18 and the timing signals from the generator 60.

Figure 3:
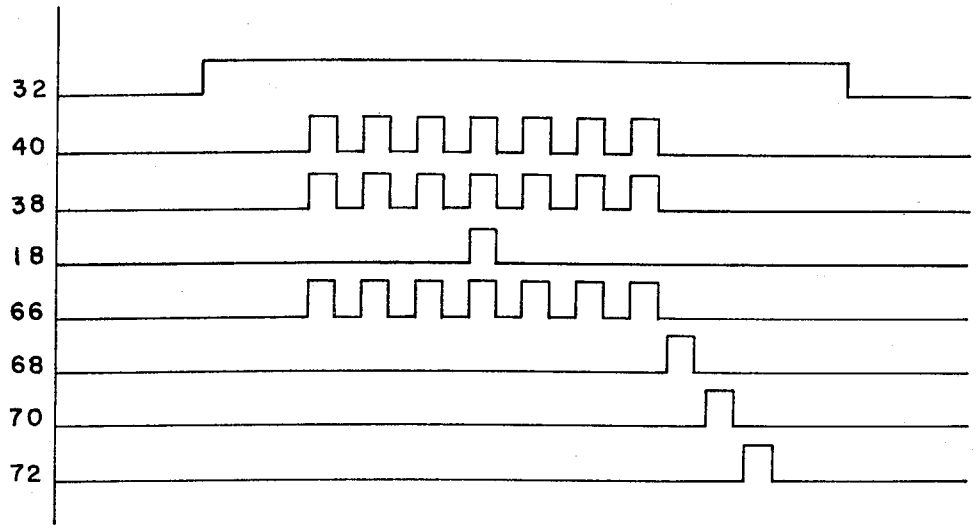
FIG. 3 is a waveshape diagram of the circuit signals occurring in the circuits shown in FIGS. 1 and 2 during the concurrent operation thereof.

Waveshapes representative of the operation of the circuits shown in FIGS. 1 and 2 are shown in FIG. 3 with references numerals attached thereto to identify the circuit elements associated with the waveshapes. Thus, the waveshape identified as "32" is the output of the tone wheel detector 32 and is effective to define the time duration of the detection of a recorded indicia on the tone wheel 34. The application of this signal to the tone wheel detector 36 is effective to produce a series of clock pulse on line 40 shown as waveshape "40" to be applied to the timing pulse detector 56 on the recording arm 8. The tone wheel detector 36, also, produces an output signal on line 38, shown as waveshape 38, which is applied to the writing logic 18 to control the application of output signals from the writing logic 18 to the converter 62 and to define the duration of the serial group of output signals from the writing logic 18 representative of a digitally encoded instantaneous amplitude level of the input signal applied to the input terminals 22. Since the frequency of the signals applied to the writing logic 18 and the detector 56 are the same frequency, the output of the writing logic 18 is synchronized with the storage in the converter 62. The writing logic 18 during this time interval, as shown by waveshape "38," is effective to produce an output pulse having a location during this time interval corresponding to the one of the recording elements 6 which is to be energized. Using the example of seven recording elements illustrated in FIG. 2, the writing logic 18 is arranged to produce an output pulse in one of seven positions during the occurrence of waveshape "38" to correspond with a desired energization of one of the recording elements 6. An example of such an output pulse is shown in waveshape "18" corresponding to the fourth location in a serial group of pulses. Since the number of clock signals from the timing generator 60 corresponds to the number of the signals from the detector 38 and to the number of positions in a serial group, the output signal from the generator 60, i.e., waveshape "66," is shown with seven clock pulses to be applied to the convertor 62. These clock pulses are synchronized with the frequency signal "40" applied to the detector 56 and occur during the interval of the waveshape "38" defining the duration of the serial group of pulses. Thus, the pulse waveshape 18 is stored in the converter 62 in the same position, i.e., fourth, as it was supplied from the writing logic 18. The writing logic 18 is arranged to be automatically cleared after the completion of the transfer of a group of pulses to the converter 62, and a new analog-to-digital conversion process on the input signal on terminals 22 is performed before the detection of the next indicia on the tone wheel 34. The waveshape 68 is the transfer pulse applied to the storage register 64 while waveshape "70" and "72" are the subsequent "clear" pulses for converter 62 and the storage register 64, respectively.

Accordingly, it may be seen that there has been provided in accordance with the present invention, an improved P.P.I. display having means for continuously recording a visible display on a recording surface and including means for providing erasure of prior recorded information to provide a fresh recording surface.

The embodiments of the invention in which an exclusive property or privilege is claimed are defined as follows:

1. A recording apparatus comprising
   a display face including a display surface having deposited thereon a suspension of force field responsive, light reflective and flake-like particles;
   first force field means for preorienting said particles into a first light reflective state;
   second force field means for orienting said light reflective particles into a second light reflective state;
   said first and said second force field means being arranged to extend along respective radial lines originating at a common point on said recording surface;
   means for inducing a relative motion between said recording surface and said first and second force field means;
   means for continuously energizing said first force field means; and
   means for selectively energizing said second force field means in response to input signals to be recorded on said recording surface.

2. A recording apparatus as set forth in claim 1 wherein said first and second means are mounted on respective arms connected at one end thereof to a common shaft located at the center of said recording surface and said means for inducing relative motion includes a motor means for driving said shaft.

3. A recording apparatus as set forth in claim 2 wherein said second means includes a plurality of separately operable force field producing means each capable of orienting said particles.

4. A recording apparatus as set forth in claim 1 wherein said second means for orienting includes a plurality of separately operable force field producing means each capable of orienting said particles.

5. A recording apparatus as set forth in claim 4 wherein said particles are magnetic, each of said force field producing means and said first force field means produce separate magnetic fields.

6. A recording apparatus as set forth in claim 4 wherein said means for selectively energizing includes an analog-to-digital converter means arranged to convert an analog input signal to be recorded into a digital signal signal for energizing a predetermined number of said plurality of force field producing means.

7. A recording apparatus as set forth in claim 6. wherein said means for inducing relative motion includes tone wheel means arranged to produce output signals representative of said relative motions and including means for applying said output signals to said means for selectively energizing and said second force field means to synchronize the operation thereof.

* * * * *